(12) United States Patent
Lohmar et al.

(10) Patent No.: US 11,044,583 B2
(45) Date of Patent: Jun. 22, 2021

(54) ADVANCED SWITCHING POLICIES FOR EMBMS MOOD

(71) Applicant: Telefonaktiebolaget LM Ericsson (publ), Stockholm (SE)

(72) Inventors: Thorsten Lohmar, Aachen (DE); Hongxia Long, Shanghai (CN); Michael John Slssingar, Waterlooville (GB); Jinyang Xie, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/345,302

(22) PCT Filed: Oct. 28, 2016

(86) PCT No.: PCT/CN2016/103776
§ 371 (c)(1),
(2) Date: Apr. 26, 2019

(87) PCT Pub. No.: WO2018/076280
PCT Pub. Date: May 3, 2018

(65) Prior Publication Data
US 2020/0120452 A1 Apr. 16, 2020

(51) Int. Cl.
*H04W 4/06* (2009.01)
*H04W 76/40* (2018.01)
(Continued)

(52) U.S. Cl.
CPC ............ *H04W 4/06* (2013.01); *H04L 65/80* (2013.01); *H04W 28/0268* (2013.01);
(Continued)

(58) Field of Classification Search
CPC ... H04W 4/06; H04W 76/40; H04W 28/0268; H04W 28/20; H04W 28/24; H04W 72/005; H04L 65/80
See application file for complete search history.

(56) References Cited

U.S. PATENT DOCUMENTS 10,057,651 B1 * 8/2018 Singh ................. H04N 21/4623
2003/0232594 A1 * 12/2003 Shaheen ................ H04H 20/72
455/3.06
(Continued)

FOREIGN PATENT DOCUMENTS

CN 102017516 A 4/2011
CN 103797873 A 5/2014
(Continued)

OTHER PUBLICATIONS

3GPP, "3rd Generation Partnership Project; Technical Specification Group Services and System Aspects; Multimedia Broadcast/Multicast Service (MBMS) improvements; MBMS operation on demand (Release 12)", 3GPP TR 26.849 V12.1.0, Jun. 2015.
(Continued)

*Primary Examiner* — Jay P Patel
(74) *Attorney, Agent, or Firm* — Murphy, Bilak & Homiller, PLLC

(57) ABSTRACT

The invention relates to a BMSC in an MBMS system with improved unicast/broadcast switching comprising a broadcast decision, counting and aggregation functions taking into account resources available for broadcasting, importance and priority of content, QoS requirements for content as well as trends in consuming of content. The invention further relates to a BMSC server and software products implementation as well as a watchdog implementation providing the improvements.

8 Claims, 9 Drawing Sheets

(51) Int. Cl.
*H04L 29/06* (2006.01)
*H04W 28/02* (2009.01)
*H04W 28/20* (2009.01)
*H04W 28/24* (2009.01)
*H04W 72/00* (2009.01)

(52) U.S. Cl.
CPC .......... *H04W 28/20* (2013.01); *H04W 28/24* (2013.01); *H04W 72/005* (2013.01); *H04W 76/40* (2018.02)

(56) References Cited

U.S. PATENT DOCUMENTS

| | | | | |
|---|---|---|---|---|
| 2004/0184438 | A1* | 9/2004 | Terry | H04W 72/005 370/349 |
| 2004/0223513 | A1* | 11/2004 | Meago | H04L 47/10 370/468 |
| 2006/0106865 | A1* | 5/2006 | Beming | H04W 36/12 |
| 2006/0252439 | A1* | 11/2006 | Cai | H04W 4/06 455/515 |
| 2008/0195664 | A1* | 8/2008 | Maharajh | H04L 67/306 |
| 2010/0124194 | A1* | 5/2010 | Chun | H04W 48/10 370/329 |
| 2010/0165905 | A1* | 7/2010 | Kanazawa | H04W 72/005 370/312 |
| 2013/0294320 | A1* | 11/2013 | Jactat | H04W 72/005 370/312 |
| 2015/0040162 | A1* | 2/2015 | Kotecha | H04N 21/266 725/44 |
| 2016/0021516 | A1* | 1/2016 | Han | H04W 68/005 370/312 |
| 2016/0165413 | A1* | 6/2016 | Bhalla | H04W 4/08 455/456.5 |
| 2016/0227553 | A1* | 8/2016 | Kim | H04W 76/40 |
| 2016/0249266 | A1* | 8/2016 | Kim | H04W 36/0007 |
| 2016/0278042 | A1* | 9/2016 | Kim | H04W 72/10 |
| 2017/0078371 | A1* | 3/2017 | Kodaypak | H04L 12/189 |
| 2017/0251341 | A1* | 8/2017 | Frost | H04W 72/005 |
| 2017/0374581 | A1* | 12/2017 | Dao | H04W 28/06 |
| 2018/0035340 | A1* | 2/2018 | Fujishiro | H04W 36/08 |
| 2018/0206137 | A1* | 7/2018 | Ryu | H04W 4/70 |
| 2019/0327582 | A1* | 10/2019 | Lee | H04W 8/08 |
| 2020/0100213 | A1* | 3/2020 | Chandramouli | H04L 12/1881 |

FOREIGN PATENT DOCUMENTS

| | | |
|---|---|---|
| CN | 105308932 A | 2/2016 |
| CN | 105723754 A | 6/2016 |
| JP | 2014510449 A | 4/2014 |
| JP | 2014529211 A | 10/2014 |
| WO | 2009130541 A1 | 10/2009 |
| WO | 2013182247 A1 | 12/2013 |
| WO | 2014017478 A1 | 1/2014 |
| WO | 2016142810 A1 | 9/2016 |

OTHER PUBLICATIONS

3GPP, "3rd Generation Partnership Project; Technical Specification Group Services and System Aspects; Multimedia Broadcast/Multicast Service (MBMS); Protocols and codecs (Release 14)", 3GPP TS 26.346 V14.0.0, Sep. 2016.

3GPP, "3rd Generation Partnership Project; Technical Specification Group Services and System Aspects; Transparent end-to-end Packet-switched Streaming Service (PSS); Protocols and codecs (Release 13)", 3GPP TS 26.234 V13.2.0, Jun. 2016, 1-174.

Unknown, Author, "MI-MooD; MBMS Service Consumption Reporting", 3GTPP TSG-SA4 #78, S4-140329, Qualcomm Incorporated, Kista, Sweden, Apr. 7-11, 2014, 4 pages.

* cited by examiner

ADVANCED SWITCHING POLICIES FOR EMBMS MOOD

TECHNICAL FIELD

The present invention is generally related to Broadcasting and Streaming in a Telecommunication Network.

BACKGROUND

Transport of Multi-Media content in a telecommunication network was traditionally done in Point to Point fashion from Content deliverer to the UE. With the growing demand for Multi-Media content transport solutions were sought to avoid network congestion.

Content and content provider is used throughout the description in a wide context as actual content as well as for example a service or offering. The content provider is the entity that provides said content which includes for example a service provider. In specific implementations the scope of content can be narrower as evident from the related part of the description.

One solution for the UMTS/GSM radio access network was Multimedia Broadcast/Multicast Service, MBMS, that enables the radio access network and the core network to save scares resources by joining users that view or use the same Multi-Media content without start time differences such as life streaming, Push to Talk (/view) service or triggered software updates. The multiple users receive the content via one radio channel/bearer. As multiple users share the broadcast via one radio channel/bearer the involved cost is lower, from radio access and core network point of view and therefore higher quality might be applied to broadcasting to multiple users then to the single users with point to point connections.

eMBMS

Evolved Multimedia Broadcast/Multicast Service, eMBMS, is a further development specifically for the Evolved UMTS, Universal Mobile Telecommunications System, Terrestrial Radio Access Network, E-UTRAN, (Long Term Evolution, LTE) as an radio access network and Evolved Packet Core, EPC, as part of the core network but can also support the earlier type of radio access network; UTRAN with GSM, Global System for Mobile Communications, Packet Radio System, GPRS.

FIG. 1 provides an overview of the connection of a UE, User Equipment, via radio access network and core network till the content provider with the involved nodes of the core network. The interfaces denoted in FIG. 1 are 3GPP defined interfaces. The MBMS/eMBMS system of FIG. 1 is described in 3GPP TS 26.346. Throughout the description MBMS will be used as general identification of MBMS/eMBMS.

Typical use cases are;
Delivery of media/content to UEs, gathered highly dense in a limited area, i.e. a stadium where user view the same life stream/life TV content. MBMS can use the MBMS Streaming Delivery Method RTP/RTSP Real Time Protocol/Real Time Streaming Protocol, as protocol to deliver live TV, media content according to DASH, Dynamic Adaptive Streaming over HTTP, is delivered as segment files with the MBMS Download Delivery Method DASH/FLUTE.
Delivery of media content to a very large group of UEs, where users demand the same media, such as Android update, YouTube clip preloading, top popular movies, etc. The MBMS system can use the MBMS download delivery method UDP/FLUTEUser Datagram Protocol/File Delivery over Unidirectional Transport as protocol to deliver these files.

When in MBMS content is delivered under control of MBMS it is denoted aMBMS user service. FIG. 2 provides a data model of user services, as defined in 3GPP TS 26.346.

User Service Bundle Description is the one to group user services. It may contain one or more User Service Description instances. It may also refer to a single FEC, Forward Error Correction, Repair Stream Description.

The User Service Description instance contains one or more Delivery Method descriptions, which are used to describe how the service is delivered to UE. A Delivery Method description refers to a Session Description instance, which describes the delivery related parameters. An Associated Delivery Procedure Description may also be referenced by Delivery Method description to provide the complementary delivery method for the service, e.g., file repair, reception reporting, and consumption reporting.

An MBMS User Service containing multiple content components may be carried on a single MBMS delivery session, or on multiple delivery sessions. The UE can expect to receive MBMS data during the described time period(s) when at least one of the sessions for the User Service is active.

MooD

MBMS operation on Demand, MooD, represents an operational concept for MBMS and associated technical architecture and functionalities which enable concurrent demand by multiple users for a service or content item for unicast delivery to be detected by a network operator, against a threshold based on operator policy. This detection can be used to dynamically trigger the establishment, at the Broadcast Multicast Service Center, BMSC, of an MBMS User Service to offload the unicast network for delivery of the same service or content to multiple users. Subsequently, the BMSC will initiate the typical processes for MBMS service announcement/discovery and delivery. When concurrent user demand for that same service/content drops below a configurable level (also set by operator policy), the delivery mode can be configured to transition back from broadcast to unicast.

According to 3GPP TS 26.346 and TS 26.849, in "MBMS operation on Demand", or MooD, certain content that is initially delivered over the unicast network may be turned into an MBMS User Service, typically to use MBMS Broadcast, in order to efficiently use network resources when the traffic volume exceeds a certain threshold. Such dynamic conversion from unicast delivery to MBMS delivery is also referred to as "MBMS offloading". The MBMS offloading may apply to unicast traffic carried over HTTP or RTP/RTSP. In the former case, the MBMS download delivery method is used, and in the latter, the MBMS streaming method based on RTP is used, for delivering the offloaded content.

Problem

According to the 3GPP TS 26.234 and TS 26.849, when unicast traffic volume for the same service or content exceeds a certain threshold in certain area, HTTP proxy or consumption reporting server should indicate such occurrence to the BMSC to enable MBMS offloading.

This solution typically assumes that activating an MBMS broadcast in a certain area is always possible, meaning free resources to activate a broadcast are always available. In practice however the number of broad cast bearers (broadcast resources) available is limited and may not be constant in time due to network load, QoS etc. When many services are MooD enabled and the majority of UEs is MBMS capable, competition situations will occur. A competition occurs, when several services are popular enough to justify MBMS broadcast, and the system has not enough resources available to activate all.

Using a threshold based on the number of users is a too arbitrary and rough mechanism. There are several drawbacks of the current simple threshold decision to switch to broadcast:
  The broadcast resources will be exhausted quickly due to the arbitrary and rough decision.
  The network offloading can't be made efficient since a service with a higher traffic load can't retrieve the resources for broadcast which are occupied by a service with a lower traffic load but above the threshold.
  The simple threshold mechanism does not account for the importance of the service.
  The high revenue service can't be delivered with the high QoS since the bandwidth is not enough for switching to broadcast. Even a lower QoS broadcast delivery can't be activated.
  The unicast service consumption in this area was just a short burst, and the service becomes the unpopular in short time. Therefore switching to broadcast could be avoided and other services with a high consumption level, but lower than the "hype" service peak could instead be delivered. See FIG. 3A.

Summarizing; major drawback of the simple threshold based on the number of users of a service does not account for other aspects of the services like importance of the service, timely behavior of the number of users, the required bandwidth of the service, etc.

SUMMARY

Solution for the identified problems in the background is provided by an improved Broadcast Multicast Service Center, BMSC, in the Multimedia Broadcast/Multicast Service, MBMS, system that takes into account the importance of a service, a priority of a service, actual consumption and the trend of consumption of a service as well as the availability of resources for deciding to switch to broadcast or back to unicast.

In first aspect the BMSC in a MBMS system is improved by making the thresholds dynamic based on availability of resources for broadcasting content. The BMSC decides on switching between unicast and broadcast delivery of content to User Equipment, UEs, connected to the MBMS. The BMSC receives counts on the consumption of said content by UEs. The BMSC adjusts first applied thresholds on basis of the availability of resources for broadcast delivery of content. The BMSC decides to switch content from unicast to broadcast delivery when the counts of UEs consuming said content exceeds said first adjusted thresholds.

In an embodiment the BMSC applies second thresholds and adjusts said second thresholds on basis of the availability of resources for broadcast delivery of content. The BMSC decides to switch content from broadcast to unicast delivery when a count of UEs consuming said content becomes lower then said adjusted second thresholds.

In a further embodiment the BMSC adjusts thresholds on basis of available bandwidth for broadcast and/or maximum number of broadcast bearers possible.

In a further embodiment the second thresholds are lower then said first thresholds to avoid frequent switching between unicast and broadcast.

In a further embodiment the first and second thresholds are adjusted per area based on the available resources for that area.

In a further embodiment the BMSC receives a request for broadcast of content, and the BMSC starts a MBMS user service for the content. In addition, the BMSC may add the content to a MBMS user service bundle.

In a further embodiment the BMSC receives the counts of said UEs consuming content per area on basis of the location of said UEs being inside that area. Where the area for counting is a location area, and where the area for adjusting is a radio cell area, and where the coverage area of the location area comprises a number of radio cell areas, the BMSC divides the counts of UEs consuming content by the number of radio cell areas to obtain an average density of consumers.

In a further embodiment the BMSC ranks all content for which the count exceeds said first thresholds on basis of said count. The BMSC keeps or switches to broadcast higher ranking content that can be supported by the available resources for broadcast delivery. The BMSC leaves or switches back to unicast the remaining lower ranking content that cannot be supported by the available resources for broadcast delivery.

In second aspect the BMSC is improved by assigning a category to content, where content belongs to a certain category having an importance/priority value. The BMSC receives definitions of said categories and assigns on basis of these definitions.

In an embodiment the received count of UEs that report consumption of content is adjusted on basis of an importance/priority value of the category assigned to the content.

In a further embodiment first thresholds are differentiated for one or more categories by assigning categories to the first thresholds. The first thresholds are adjusted to availability of resources and applied to received count of UEs consuming content on basis of match of an assigned category of a first threshold with an assigned category of a received count of UEs consuming content.

In a further embodiment content is excluded for comparison with said adjusted first thresholds and switching to or keeping delivery of said content in broadcast independent of said adjusted first thresholds when the assigned category to said content has a certain importance/priority value.

In third aspect the BMSC is improved by checking if lower Quality of Service, QoS, can be applied to have additional content in broadcast. Therefore all content is ranked on basis of a count of said content and the count exceeding first thresholds. Higher ranking content that can be supported by the available resources for broadcast delivery is switched to or kept in broadcast. Lower ranking content that cannot be supported by the available resources for broadcast delivery is kept or switched back to unicast. The lower ranking content is checked for alternative QoS that would allow switching that content to broadcast and still supported by the available resources for broadcast delivery.

In a further embodiment said higher ranking content is checked for alternative QoS consuming fewer resources and apply said alternative Quality of Service for said content to free resources.

In fourth aspect the BMSC is improved by adjusting counts of UEs that report consumption of content with a factor based on a trend in time of said counts.

In a further embodiment the factor is calculated on basis of integration of a number of consecutive counts.

In a further embodiment the factor is calculated on basis of differentiation on a number of consecutive counts.

In a further embodiment third thresholds are applied for deciding to end a MBMS user service when a count of UEs consuming said MBMS user service becomes lower then said third thresholds.

In further aspect the BMSC is improved by a Broadcast Decision Function, BDF, adapted to perform any of the above methods.

In further aspect the BMSC is improved by a watchdog component comprising a counter, decider, and a threshold control. The counter has a receiver for receiving reports from UEs consuming user services, a register per user service for counting the number of UEs that report consummation of user services and transmitter for transmitting at regular interval a counted number of UEs consuming user services. The threshold control has a receiver for receiving available bandwidth for and/or number of available broadcast bearers, calculation logic for calculating a threshold offset from available bandwidth for and/or number of available broadcast bearers and transmitter for transmitting said threshold offset. The decider has a receiver for receiving at a regular interval the counted number of UEs consuming said user services, logic to compare said counted number with a set of thresholds adjusted with a threshold offset received from threshold control, and output for a MBMS unicast/broadcast switch signal for said user services.

In a further embodiment the watchdog component has counter having input for receiving a new user service event signal used by the counter to add a register for said new user service.

In a further embodiment the watchdog component has counter having input for receiving an end user service signal used by the counter to remove a register for said user service to end, and the decider having output for transmitting said end user service signal.

In further aspect the improvement relates to a computer program product comprising coded instructions to let a BMSC server execute any of afore mentioned methods.

In further aspect the improvement relates to a computer readable medium comprising the computer program product.

The stated improvements bring following advantages to the MBMS system;

Policy driven selection of MBMS broadcast content per area

Services are ranked per area according to well-defined metrics.

Better efficiency on the network traffic offloading

Increase of operator's revenue based on the MooD switching policy rules

Device density of the service, gradient of device density, defined category on basis of service priority, service type and payment of the content providers, QoS as well as resource availability are taken into account for switching decisions between broad cast and unicast.

release the broadcast resources based on the policy rules by stop/downgrade the lower priority broadcast service to release the broadcast resources for the higher priority service stop/downgrade the lowest device density broadcast service to release the broadcast resources for the higher priority service protect the public safety service and government compulsory service The BMSC has included a "Broadcast decision function" (BDF), that determine the threshold for the switching decision, checks the switching decision rules, includes persistent duration of exceed threshold, the gradient of traffic volume change. The decision between broadcast and unicast of content will be more reasonable and efficient.

Even if BMSC-BDF decides to enable the broadcast in a certain service area, the available broadcast resources in that service area may be not enough for the new broadcast service. BMSC-BDF can execute the policy rules control when it meets such situations, BDF can take the relative actions to release enough broadcast resources for the new higher priority MooD-eligible service, i.e., decreasing the bitrate (quality) of the low priority broadcast service, stopping the low priority broadcast service in this area, stopping the lowest device density service in this area, or just keep it as pending for a while.

The priority can be defined through "content provider payment", "device density in the area", "service type" (i.e. MC-PTT, ETWS, or Multimedia Broadcast Supplement for Public Warning System, MBSP) has the higher priority than the other media service) in BMSC.

The device density, device density gradient and the persistent duration of exceed threshold can be available from HTTP proxy or the BMSC consumption reporting server depending on the used unicast and broadcast counting method. An intermediate Consumption Aggregation Function (CAF) may hide the sources of the counting information to the BDF and may offer an advanced interface for controlling thresholds and triggers.

The ranking typically changes over time due to service consumption dynamics. Consequently, the BDF may need to frequently review earlier decisions. And, some services may be moved to unicast, although the device density criterion is still met.

The BDF may decide NOT to move a service to MBMS broadcast, although the criterion is met. Then, users will consume service reception on unicast, likely with a decreasing quality. The SLA between the content provider and the operator may allow the operator to keep services on unicast, although the switching criteria are met.

The BDF may also decide to decrease the quality of already on-going sessions. Here, the BDF needs to trigger an MBMS Session Update in order to decrease the bitrate of the MBMS bearer and also trigger ingest to reduce the media quality (either by reconfiguring the encoder or by selecting a different representation).

BRIEF DESCRIPTION OF THE DRAWINGS

The above-mentioned and other features and advantages of the disclosure will be best understood from the following description referring to the attached drawings. In the drawings, same reference numerals denote identical parts or parts performing an identical or comparable function or operation.

DETAILED DESCRIPTION

Figure 1:
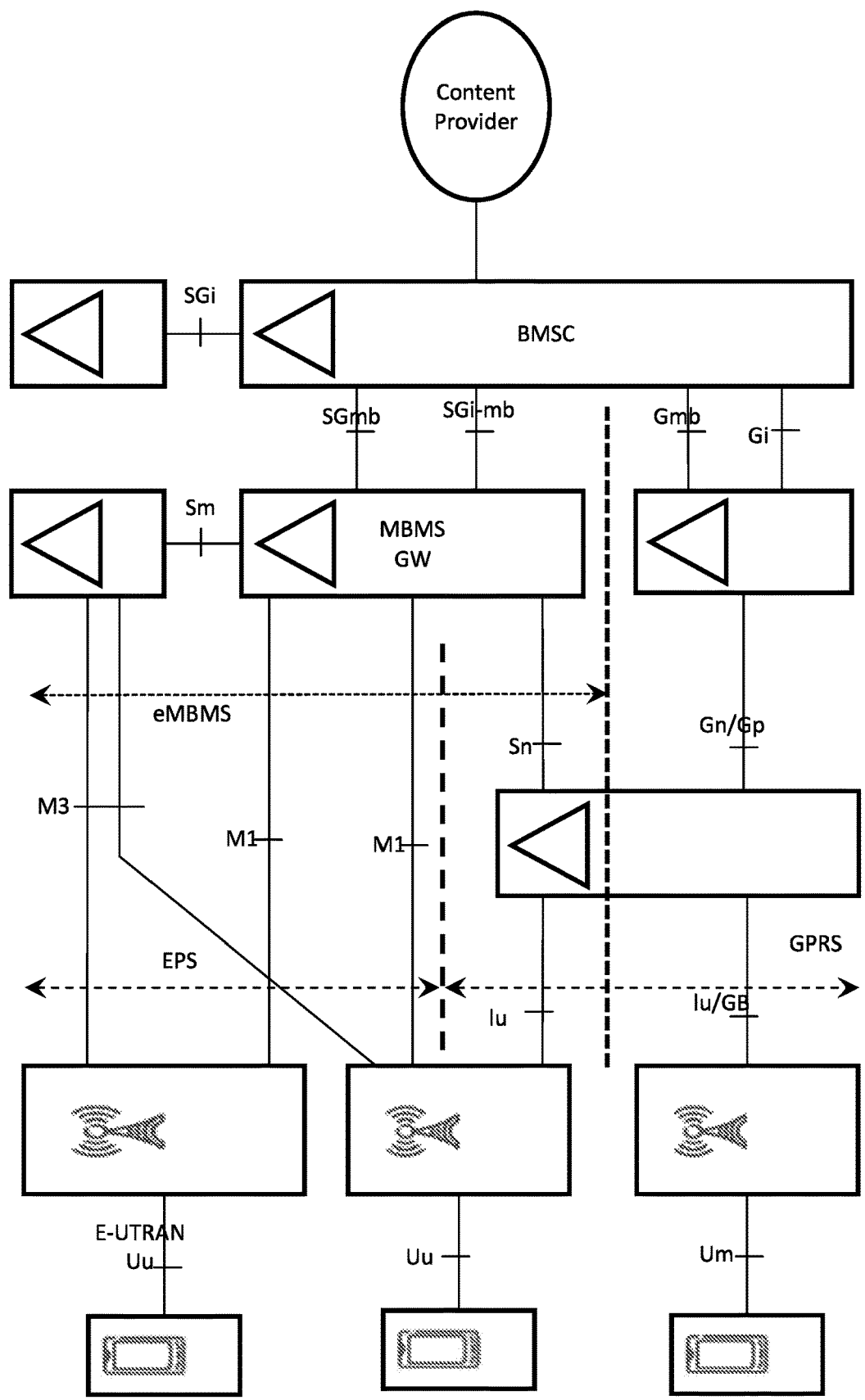
FIG. 1 provides a schematic diagram representing a high level architecture of an MBMS in a telecommunications system.
Figure 2:
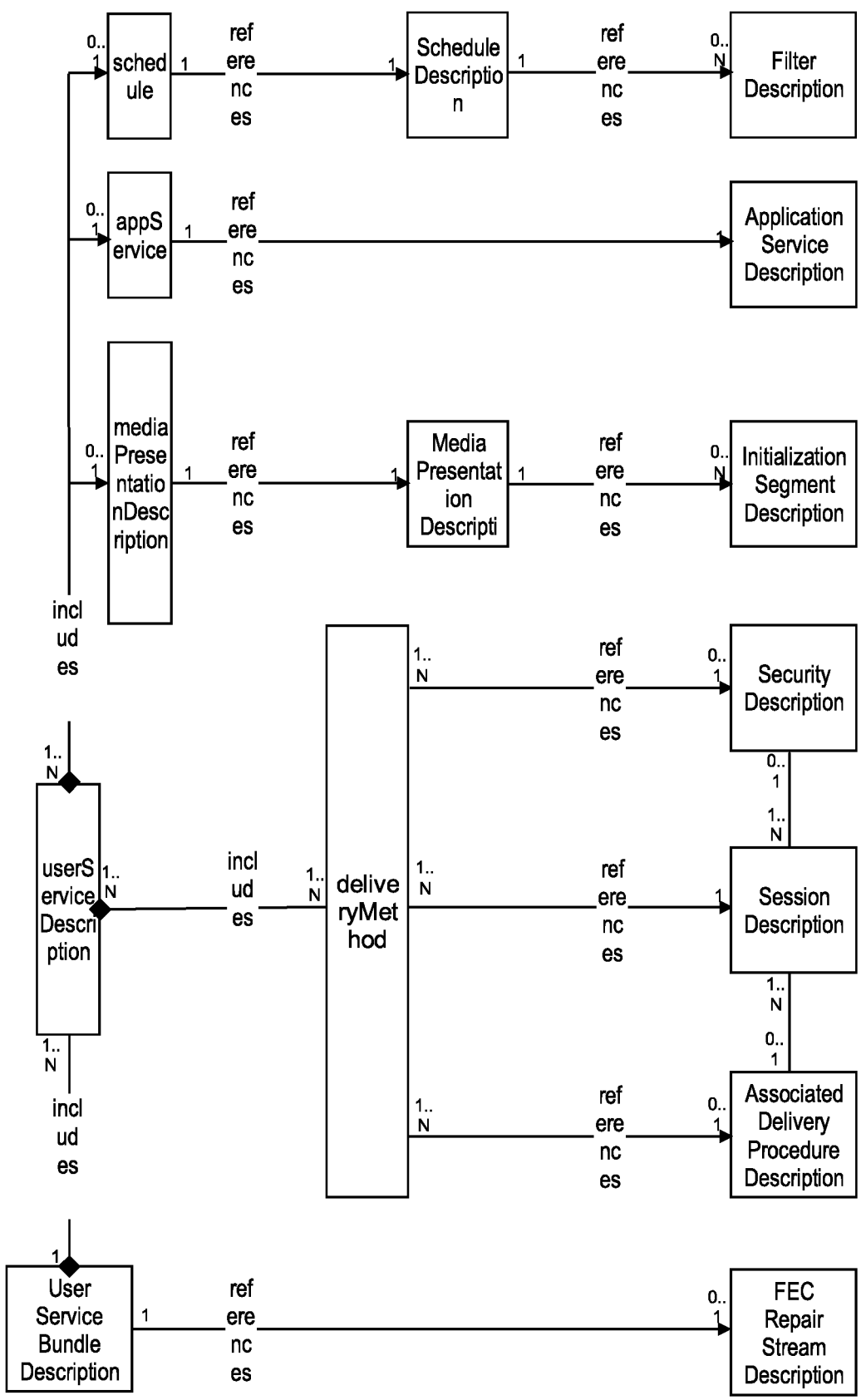
FIG. 2 provides a data model representing entity &relations for user services in MBMS FIG. 3A provides an example of concurrence of 2 contents.

MooD (MBMS operation on Demand) is an operational concept which enables concurrent demand by multiple users for a service or content item for unicast delivery to be detected by a network operator, against a threshold based on operator policy. This detection can be used to dynamically trigger the establishment, at the BMSC, of an MBMS User Service to offload the unicast network for delivery of the same service or content to multiple users.

Dynamic Switching

3GPP initially did not define for MBMS switching from unicast to broadcast and vice versa. Initially it was assumed that consumption of the service is started independently from MBMS. Content was predefined by operator or deliverer/proxy policy for one or the other. A MBMS user service typically applied for MBMS broadcasted content. With MooD, 3GPP brought in dynamic switching as turning any unicast delivered service into an MBMS User Service based on counting of the consuming users. A predefined first threshold initiates switching from unicast to broadcast when consumption count exceeds the first threshold and a second threshold for switching back when consumption counting becomes less than the second threshold. The first threshold may be higher than the second to avoid oscillation between unicast and broadcast.

In order to enable consumption counting, the user device added specific MooD headers into the HTTP requests for the service consumed in unicast so that network proxies were able to track consumption of their content. Only those UEs that are capable of MBMS insert the header.

Later, when 3GPP added MBMS unicast so that an MBMS User Service may start with unicast or MBMS Broadcast, UE based reporting of the consumption was introduced. The UE is already aware about the fact that the service is an MBMS user service by means of the MBMS user service announcement/discovery, but MBMS broadcast is not used in the present location of the UE because the volume was not exceeding the threshold. When the UE is consuming the service in unicast, it may already do certain MBMS specific procedures, such as consumption reporting. This is referred to as MBMS unicast, as the MBMS service is active but the provisioning of the content/stream is in unicast. Unicast content delivery for which no MBMS service exist is then revered to as non MBMS unicast.

As a result, 3GPP defines two methods to count or measure unicast service consumption; non MBMS unicast by means of MooD headers when the UE is MBMS capable, and for MBMS unicast UE based consumption reporting. For MBMS broadcast counting or measuring only by means of the UE based consumption reporting.

Initiation of the MBMS user service;

There are two types of MBMS offloading: UE-Elected and Network-Elected offloading. In both types, there could be a network proxy/server that detects whether unicast traffic volume for the same service or content exceeds a certain threshold, and to indicate such occurrence to the Broadcast Multicast Service Center, BMSC, to enable MBMS offloading. To assist the MooD decision, consumption per area is required, the network proxy/server may obtain an UE location from the UE per operator's policy. Alternatively, the network proxy/server may act as an Application Function in requesting from the PCRF, Policy and Charging Rule Function, via the Rx reference point, the UE's location information via the 3GPP-User-Location-Info AVP, Attribute-Value Pair. The network proxy/server may also use a LCS, LoCation Services, procedure to obtain the UE's location information. The network proxy/server may deliver user location information to the BMSC for MooD decision.

For UE elected offloading OMA-DM, Open Mobile Alliance (OMA) Device Management (DM), should be used to specify the MooD configuration information. If such a DM configuration object exists on the UE, the UE shall use it whenever it elects to support MBMS offloading. The OMA DM management object is used to configure offloading for any type of eligible content accessed over the unicast network.

MooD based on consumption reporting;

Towards attaining more accurate knowledge of ongoing consumption of an MBMS User Service, consumption reporting procedures are defined 3GPP. This functionality better enables the MBMS service operator to decide, based on real time demand of an MBMS User Service, to either Switch to broadcast: establish service delivery over an MBMS bearer in a given service area;

Switch to unicast: teardown service delivery over an already established MBMS bearer in a given service areas to only leave service delivery over unicast and doing so in a dynamic manner, to best utilize overall network capacity resources in supporting unicast and/or MBMS services delivery. The MBMS service consumption reporting procedure is initiated by the MBMS receiver (UE) to the BM-C, in accordance to parameters in the Associated Delivery Procedure, ADP, description.

The lowest granularity for consumption reporting is a Service Area as identified by the Service Area ID which is also called a Counting area. The Service Area is the smallest possible area, which the system can toggle between broadcast and unicast. A broadcast area is described by a list of Service Area, each identified by a SAI.

Consumption Reporting shall not be performed by the UE if any of the following conditions are met:
  If the r12:consumptionReport element is absent under the Associated Delivery Procedure description;
  If the r12:consumptionReport element is present, and the location type requested to be reported is MBMS SAI and
    there is no match between any of the SAI in the USD with the entries in the MBMS SAI list prepared for inclusion in the Consumption Report request message, or
    SIB 15 is not present.

Once the need for consumption reporting has been established, the MBMS receiver, e.g. the UE, sends one or more Consumption Reports including;
  the client identity; clientId,
  the service identity; serviceId, associated to the selected service,
  current serving location information (e.g., SAIxor CGI) and
  an indication of consumption,
to the consumption report server identified by the service-URI associated to the selected service. When the BMSC detects that there are enough UEs consuming the service on unicast in SAIx, it may decide to trigger the sending of the service over an MBMS broadcast bearer.

Service Continuity;

In MBMS, DASH Service continuity is realized through the "Unified MPD" and additional USD, User Service Discovery, level information. The unified MPD, Media Presentation Description, describes all representations of the content, which are available through unicast and/or broadcast. The USD level information allows the MBMS Client in the UE to filter, which quality representations are available depending on the access system.

When the MBMS client detects changes on the radio, for instance, the broadcast area is deactivated or the UE is leaving the broadcast area, the MBMS Client is steering the DASH Player to the according representations and locations.

State of the art unicast to MBMS broadcast switching.

The following summarizes the aforementioned elements for a scenario for switching unicast to MBMS broadcast via MBMS unicast and back to unicast again.

A UE request certain contents or a stream. It forwards the request towards a proxy server. Typically the proxy server will not be part of the MBMS system itself, but in certain circumstances it might be. The UE will enter in the request a MooD header under certain circumstances;

The UE is enabled for MBMS (it has an MBMS client), and

A browser, app or the like used for accessing the content/stream instructs the UE to include the header, or A preprogrammed operator policy in the UE instructs the UE to add the header for certain proxies.

The Proxy server detecting the request will count the number of requests in an area made by different UE's that are MBMS enabled and the location of those UE,s for the same content/stream. If the count for an area content/stream combination exceeds a certain threshold the proxy server can request offloading of a specific content/stream for broadcast via MBMS. The threshold may be configured in the proxy or may be obtained from a PCRF or similar function of the communications network.

The BMSC receives the request and will start a MBMS service for the new content/stream available, i.e. initiate MBMS unicast including MBMS service announcement/discovery. After that it will send an OK to the proxy server to start redirection. The acknowledge message containing the new proxy that shall be used.

The intermediate step via MBMS unicast does not require an actual change of proxy. The redirect is only required to trigger the UE to activate the MBMS client for the requested content/stream and force the UE to report consumption instead of adding the MooD header.

The Proxy server will now send each UE that indicate MBMS capability with the inclusion of the MooD header in their request, a redirect message with the new proxy to use. Alternative is that the MBMS capable UE retrieves the MBMS broadcast directly from the announcement/discovery procedures as outlined in 3GPP TS 26.346.

Each UE receiving the redirection will start its local MBMS client unless that is already active for a different content in MBMS and will start consumption reporting according to the ADP for the content/stream in the advertising.

The BMSC acts now as proxy and provides the content/stream in MBMS unicast as MBMS service. This is the BMSC proxy solution. Instead the original proxy may still deliver the MBMS unicast, the proxy server MBMS unicast solution. In later case also continuation of mood header insertion is possible with MBMS unicast and the proxy server provides the counts to the BMSC.

The BMSC counts the popularity of the content/stream in areas based on the consumption reporting by the UE's.

If for a certain area and content/stream a threshold is exceeded, the BMSC switches the MBMS unicast to MBMS broadcast, and the UE's MBMS client following the regular advertisements of the BMSC will switch from MBMS unicast reception to MBMS broadcast reception. The UE's will continue to report consumption to BMSC as instructed by the ADP. The threshold may again be preconfigured or obtained from a PCRF or other function in the communication system.

It shall be noted that the counting function and the decision function are separated functions and that in some implementations the counting function is outside the BMSC as to allow anonymity for user, content, location information. The external counting function will inform the decision function in the BMSC of aggregated numbers of users per content/area combination. To which counting function the UE shall report is again contained in the ADP.

UE's that request the content/stream after it is switched to MBMS broadcast will receive the redirect message, activate the MBMS client and directly start with MBMS broadcast reception.

At a certain point in time the BMSC may detect that for a specific combination of content and area the use count gets below a threshold (again preconfigured or obtained) and decides to switch back from MBMS broad cast to MBMS unicast. The switch back is included in the MBMS service announcement/discovery, and the MBMS clients in the UE's will switch from broadcast reception back to unicast reception.

At a still later point in time there are no MBMS unicast consumption reporting, or a fixed time period after switch back to MBMS unicast or when the consumption reporting is below a threshold, the BMSC will stop the MBMS service by informing the proxy server to stop redirection, removing the MBMS unicast from the MBMS service announcement/discovery. The BMSC may redirect remaining UE's back to the original proxy server in the case of the BMSC proxy solution.

Remaining UE's will stop their consumption reporting for the applicable content/stream put further requests to the original proxy server and include the MooD header as instructed.

It shall be noted that several threshold are used and those shall be constituent with each other as to avoid frequent switching.

Dynamic Thresholds

The state of the art BMSC uses static thresholds. In a first aspect the function of the BMSC is improved by making the thresholds dynamic as function from the availability of resources for MBMS broadcast bearers. Most important resources limitations are the number of broadcast bearers and the total bit rate available. These resources have a maximum based on the configuration of the radio access system. However due to circumstances these values may become lower. Having fixed thresholds based on these maximum resource capacities might be done but will have drawbacks at outlined before.

In a first embodiment, the nominal value of the thresholds is determined by the maximum number of simultaneous MBMS broadcast bearers and the actual threshold values are lowered with the same percentage as the actual available bearers are less than the maximum number.

In a second embodiment the nominal value of the thresholds is determined by the maximum available bit rate for all simultaneous MBMS broadcast bearers and the actual threshold values are lowered with the same percentage as the actual available bit rate is less than the maximum bit rate.

In a third embodiment a combination of both is used. The lower of the two percentages is used to lower the actual threshold values.

In this way the thresholds are dynamic towards available resources and the BMSC knows when a MBMS bearer can be added or not. This also makes the state of the art mechanism obsolete that the BMSC first tries to set up the bearer and then gets a denial from the radio access system that this is not possible due to lack of resources. Using a dynamic threshold is comparable to ranking content for which an MBMS user service is established on basis of their consummation count. Only higher ranked then the threshold will be kept or switched to broadcast and lower will be kept in unicast are switched back to unicast.

In a fourth embodiment separate thresholds are used. The first determining to switch from unicast to broadcast and a second one for switching back from broadcast to unicast. Having separated thresholds has the advantage that no oscillation in switching takes place. Switching back to unicast is substantially lower than switching to broadcast so providing a hysteresis which avoids frequently switching of content delivery between unicast and broadcast. The fourth embodiment can be combined with the previous embodiments.

The resources may not alone vary in time but might be different per cell of the radio access system. Dynamic parameters may therefore be established for each radio access system cell and their value is adjusted with the resource availability in that cell. The above advantage extends to the fact that the BMSC can determine in which cell the MBMS broadcast bearer might be established and in which not. This provides an additional advantage in that the BMSC for efficiency of its own resources. The BMSC can avoid switching to MBMS broadcast in every cell and instead switch to broadcast for only one or a view cells and that for the majority of cells still MBMS unicast delivery is required.

In a further embodiment a third threshold is applied. Initial the BMSC acts on a request for switching a non MBMS unicast delivery of content to MBMS broad cast. First and or second threshold are used to decide switching between MBM unicast and broadcast. Third threshold is used to decide to stop the MBMS user service for content and to switch back to non MBMS delivery of content. This provides the advantage that a lot of MBMS unicast deliveries with no or very limited consumption by UEs occupy BMSC resources such as announcement, counting, session & transmission etc.

The above requires that it is known in which cell the UE is consuming content. The UE therefore adds the cell identity with the report on consumption. In certain cases the UE does not report the cell identity and the counting function uses other means e.g. location service to determine the radio cell. The UE might include in the report not a radio cell but a different area identifier, e.g. a service area. The counting function then may calculate a consumer density per radio cell as an average consumer density by dividing the count for the area by the number of radio cells constituting that area.

For a skilled person it might be clear that other aspects on resources might be dealt with in the same way and combined with the above accordingly.

Priority and Importance of a Service

The state of the art BMSC treats each content the same way. In a second aspect the BMSC is further improved in that it takes the priority and importance of the content into account when deciding to switch to broadcast or back to unicast. In practice not each content will have a high priority. Example of very high priority content would be governmental emergency push to talk services. Download of a Utube clip could be an example of low priority. For the operator life sport streaming might be very important as it is a high paid premium service whereas the earlier Utube clip is convenience and is not a cash deliverer for the operator. Importance is mostly connected to service delivery agreements between operator and content deliverer. To achieve priority and importance to influence the switching to broadcast and back to unicast the BMSC assigns to each content for which it is requested to start an MBMS service a category. The assigning takes place on basis of the category definition and details in the URL requesting the content. Each assigned category has a value. The BMSC uses the category for switching between broadcast and unicast of all content controlled by the BMSC.

In an embodiment the BMSC has the category definitions and related category value preconfigured. In a further embodiment this is available as operator policies in a repository e.g. a PCRF. The BMSC download these and checks for regular updates or updates are pushed towards the BMSC.

In an embodiment the BMSC ranks all its content under its control, whether delivered in unicast or broadcast, and ranks the content according to the category value. The ranking may be done on basis of multiplying the count of UE's consuming said content and the category value. Then, the BMSC compares the ranked list with the applicable threshold. Highest ranked content below the threshold is kept in broadcast or switched to unicast. Lower raked content above the threshold is switched back to unicast or left in unicast. Advantage of this embodiment is that only the most important and highest priority content in relation with the number of consumers will be delivered in broadcast.

In an alternative embodiment each category has its own thresholds defined in the definition. These are the nominal values of the dynamic thresholds. The ranking is now done per category on basis of the count of consumption of the content. Again the BMSC compares the ranked list with the applicable threshold. Highest ranked content below the threshold is kept in broadcast or switched to unicast. Lower raked content above the threshold is switched back to unicast or left in unicast. Specific advantage of this embodiment is that there is in principle room for each category and concurrency between very high priority content with only a few users is possible with much lower priority content with extreme amount of users.

In a further embodiment the above might be applied in a differentiated manner based on the area. Where as in general ranking is done either over all categories or by a dynamic threshold set per category, for a specific area one or more content categories can be excluded and will be broadcasted as long as broadcast capacity exists, pushing all other categories to unicast. Example are emergency services in an emergency area.

Required Bandwidth of a Service

The state of the art BMSC delivers only the requested quality of service and when the amount of space for putting it in broadcast is not enough the content is delivered in unicast. In a further aspect the BMSC may for a content select a lower quality of service if such is available for a content when broadcasting the content. Advantage is that less resources are required for bandwidth and more content may be broadcasted.

In an embodiment the downgrading of quality of service maybe preconfigured or as alternative downloaded from a repository e.g., a PCRF. The possibility to downgrade may be obtained from one of the session delivery instances in the delivery method descriptions when these specify different quality of service.

Here, the BDF needs to trigger an MBMS Session Update in order to decrease the bitrate of the MBMS bearer and also trigger ingest to reduce the media quality (either by reconfiguring the encoder or by selecting a different representation).

Trend of the Number of Users Consuming the Service

The state of the art BMSC uses for its decisions only the current count value without looking to the trend in time of the count of UEs consuming a content. In a further aspect the BMSC is in proved by adding these trend aspects in the decision to switch a content to broadcast or back to unicast. The BMSC might therefore adjust the actual count for the trend aspects.

Figure 3A:
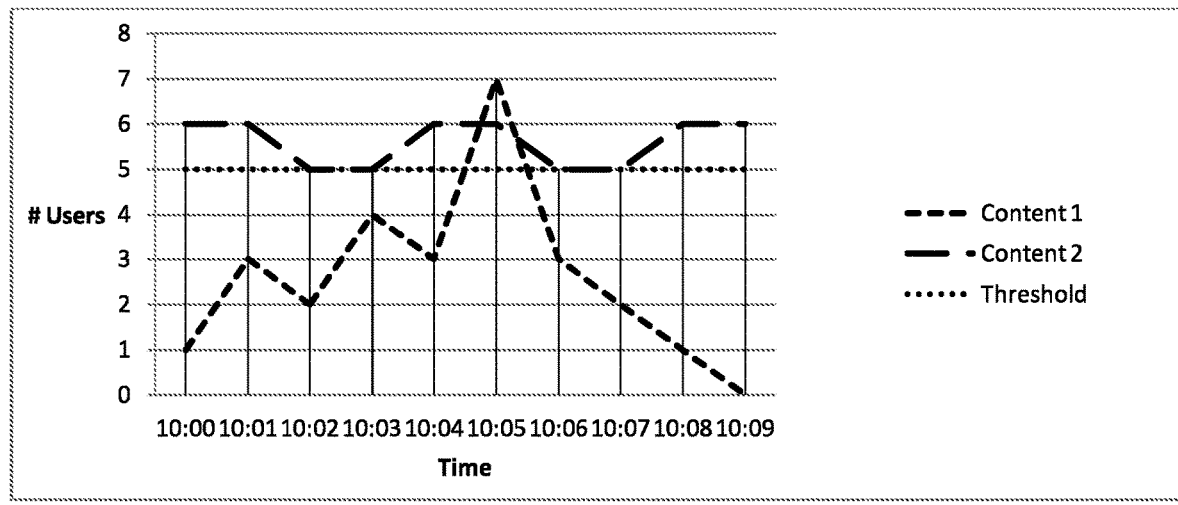
FIG. 3B provides an example of concurrence between 3 services.

A first example is provided by FIG. 3A where content 2 is consumed on a steady high level. Content 1 is consumed on a lower level except on T=10:05 where it exceeds content 1. In normal cases of proportional switching and where only is room for one broadcast channel Content 2 is transmitted in broadcast till T=10:05 when it will be switched to unicast in favor of content 1 being switched to unicast. When however integrating aspect would be taken into account the spike of content 1 would be filtered out and continuous broadcasting of content 2 is guaranteed.

Figure 3B:
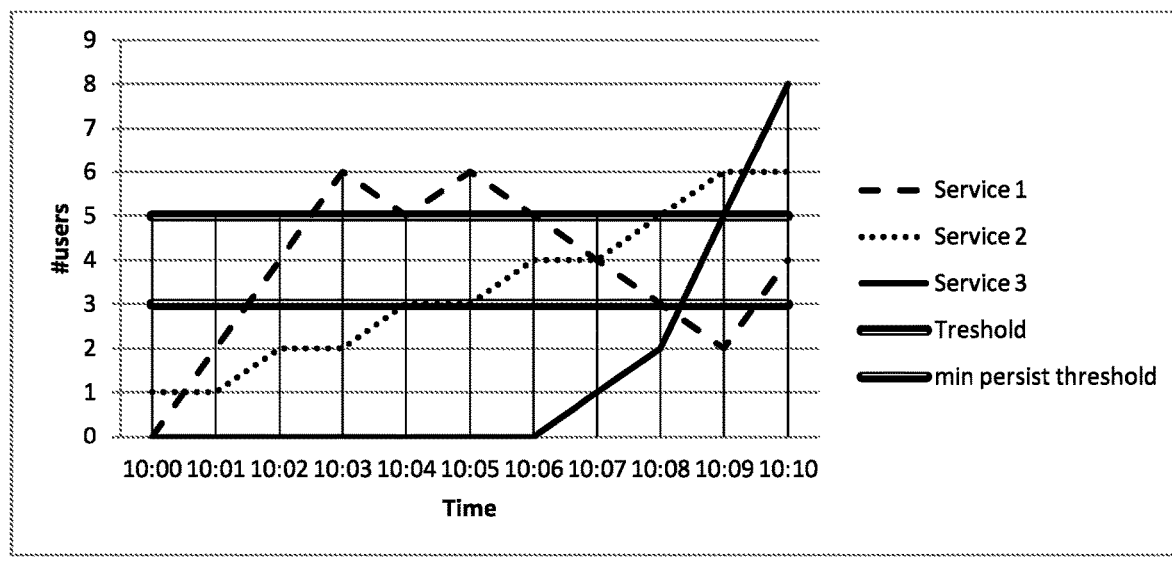

A second example is provided by FIG. 3B. Here 3 services compete for one available broadcast channel. Here there are 2 thresholds. First threshold is 5 and a service must be consumed by at least 5 UEs before it can be switched to broadcast. The second threshold (minimum persist threshold) is 3 and when a service is consumed by less than 3 UEs it will be switched back to unicast.

Given that again only one broadcast channel is available and only using proportional switching, Service 1 will be switched to broadcast on T=10:03, replaced on T=10:08 by service 2 and on T=10:10 by service 3. If also differentiating switching is applied decisions might be different based on the increase (decrease) rate of consummation. In this case it would mean that at T=10:08 not service 2 but instead service 3 is switched to broadcast as the average increase of service 2 is lower than that of service 2.

In an embodiment the count of UE's consuming a content is established with a certain time interval. The BMSC integrates the consecutive counts and so filters out short spikes where content is requested by a large number of UEs but consuming is not continued. This has the advantage that there is no temporary occupation of a broadcast bearer where other content that has a larger number of consumers (higher consumer density) outside the spike better could be in broadcast. It also is more efficient for the BMSC in that it does less frequent switching. In a further embodiment the integration is performed by taking the average of the last N counts. If Count N+1 comes the average is multiplied by N and the average is subtracted from that (*N−1). Then count N+1 is added and the new average is calculated. This average is used for the count of UEs consuming the content.

In an embodiment the count of UE's consuming content is established with a certain time interval. The BMSC differentiates on the consecutive counts to predict a future estimate of the count of UEs consuming the content. This has the advantage that when the BMSC has to decide between 2 contents for which only one broadcast bearer is available the one for which the higher future trend is selected for broadcast. In a further embodiment the BMSC adds the difference of count N−1 and N to count N to predict count N+1. The predicted count N+1 is used in the decision to switch between broad cast and unicast of the content.

In an embodiment proportional, integrating and differentiating values are combined to one count for the decision process. This may be done by simple dividing the sum of count N, average and predicted N+1 by 3. Alternative may be to have a percentage for each of the proportional, integrating and differential value, the 3 percentages adding up to 100%, and the value used for the decision process is the sum of the percentage of each. The later may be especially advantageous in combination with categories. The 3 percentages are characteristic for a certain category and contained in the category definition.

Implementation

Figure 4:
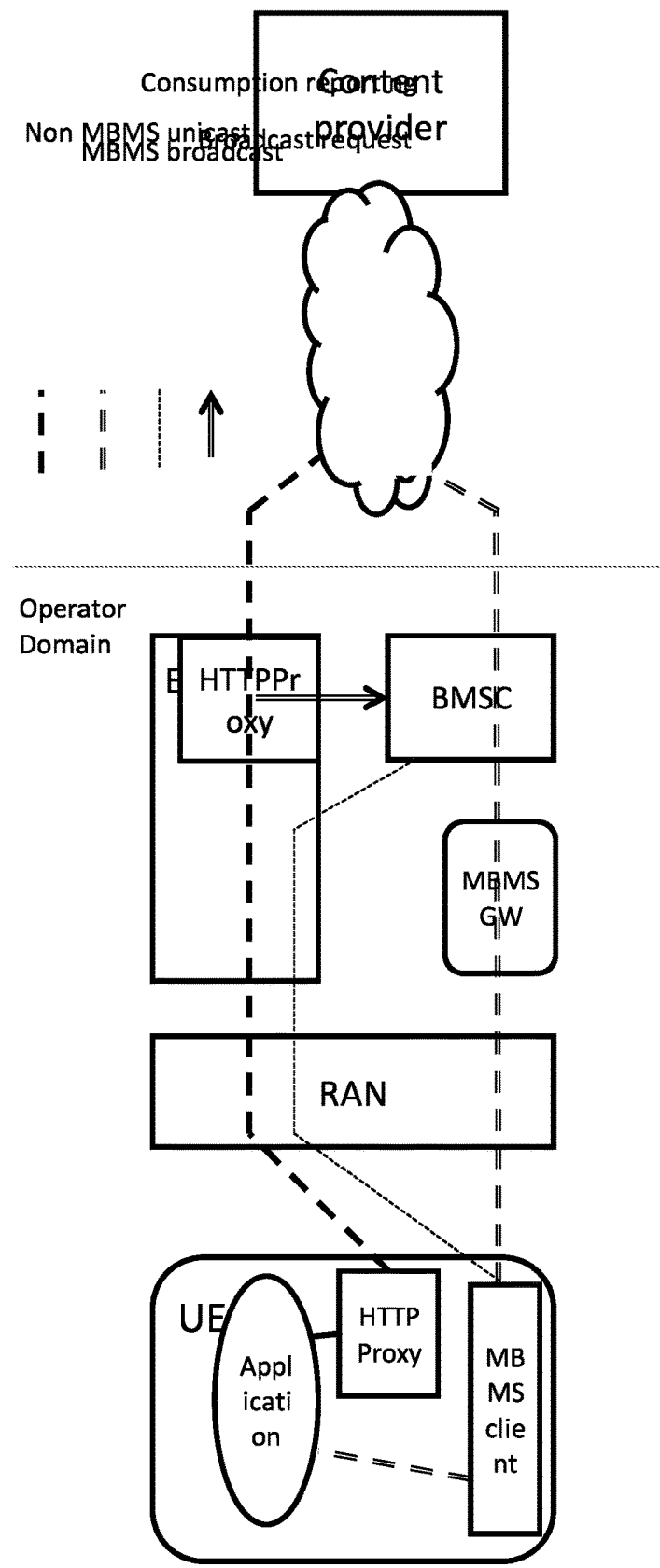
FIG. 4 provides system architecture for MBMS.

In the previous the BMSC is performing the functions. As shown in FIG. 4 the BMSC is together with MBMS gateway the core of the MBMS system situated in the core network of a communication system. The non MBMS unicast flow is from content provider via the IP network in to the operator domain via the HTTP proxy in the EPC, the EPC towards the radio access network, RAN, to the internal HTTP proxy of the UE. The HTTP proxy of the EPC is capable to count MooD headers included in content requests by the UEs. The HTTP proxy of the EPC might request the BMSC to switch the non MBMS unicast to MBMS broadcast. When such is found feasible by the BMSC, then the MBMS broadcast is initiated and MBMS broadcast content flow is from content provider via IP network, BMSC, MBMS-GW and RAN to the MBMS client in the UE. First or second flow is delivered to the application consuming the content. The MBMS client in the UE may report consuming content if so instructed. A consummation report is transmitted via the RAN and EPC and received by the BMSC where this information is used for unicast/broadcast switching decisions.

Figure 5A:
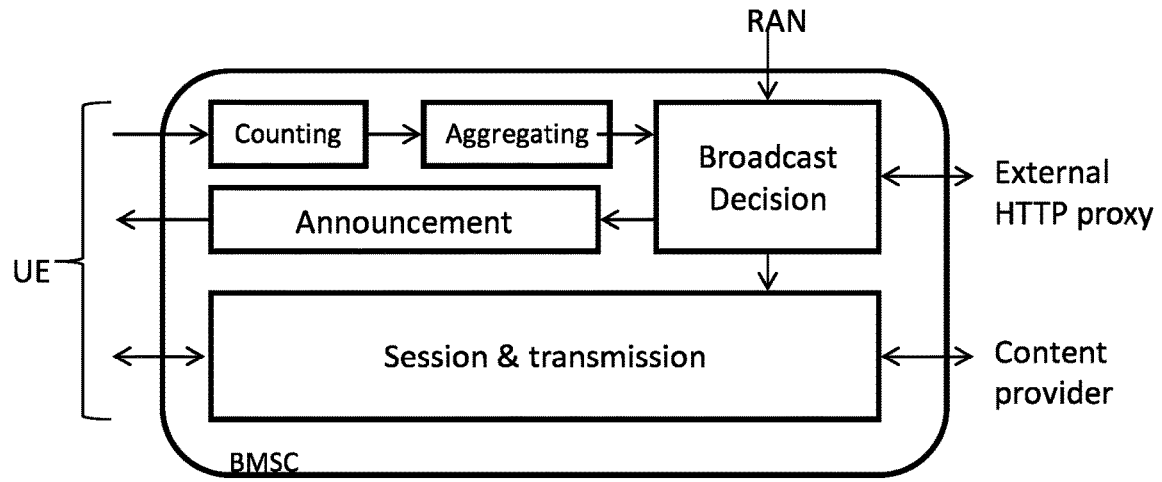
FIG. 5A provides an overview of functional entities of a BMSC.

The functions of the BMSC are provided in FIG. 5A. The BMSC might be build-up by several components that interact and perform the functions. Central element is the decision function, BDF, responsible for deciding switching between unicast and broadcast of content. The announcement function takes care of informing UEs what content is available under control of the BMSC and if such is available in broadcast or unicast as well as detailed requirements for the UEs on how to consume the content. The session and transmission function provides the content to the UEs in broadcast. In addition, not shown in FIG. 5A, a further internal proxy function might be present for unicast delivery of content. Content to be delivered is received from content providers via the IP network connection of the BMSC. The input for deciding between unicast or broadcast transmission of content is provided by the counting function. The counting function receives content consummation reporting from the UEs as instructed by the consummation requirements provided by the announcement function. In certain implementations the counting function delivers the correct count of content consumers. In other implementations a separate aggregating function adapts the output of the counting function e.g. movement of consuming UE between broadcast areas.

Some of these functions might be implemented in hardware while others are software implemented. In certain implementations some of these components might be placed outside what is architecture wise denoted the BMSC, but from operational point they do belong to the functional definition of the BMSC according to standardization. Software realized functions might be implemented on a single BMSC server or might be distributed over several servers e.g. a front-end server (CRF), an aggregation server (CAF) and an actual switching server (BDF). The switching server getting events from the aggregation server and combines the information with policy info.

Figure 5B:
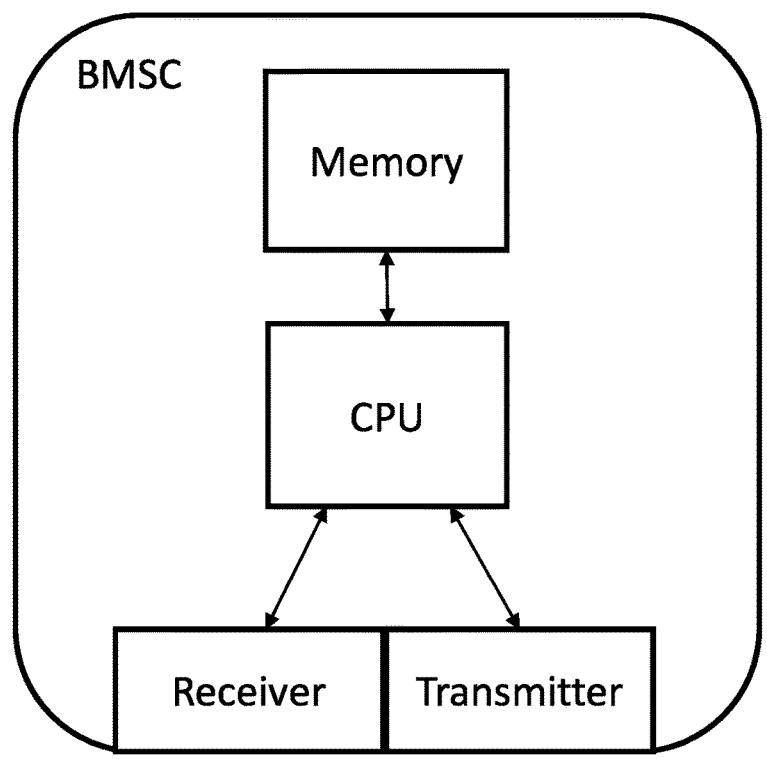
FIG. 5B provides an overview of a BMSC server.

FIG. 5B provides a view of the elements of such a server comprising a CPU executing coded instructions of the software functions in the Memory of the server. The code instructions might be grouped into modules representing specific functions. The CPU is also connected to receiver and transmitter elements that allow communication with other entities of the MBMS system. The coded instructions might be present on a carrier. The server is capable of reading the carrier and storing the instructions in the Memory before executing these instructions.

HTTP proxy/server is used in some realisations while in other realisations e.g., the actual content server or Proxy Streaming Server PSS will handle the HTTP requests with MooD header and calculate the device density per location per content served. The Consumption Reporting Function, CRF, of the BMSC will collect the user consumption reporting information and calculate the device density per location per serviceId. If the device density exceeds a certain threshold, both of them will indicate such occurrence to the Broadcast Decision Function, BDF, of the BMSC. They both will provide the interface to allow the BMSC to receive information for the latest device density and the device density gradient per service area.

Figure 6:
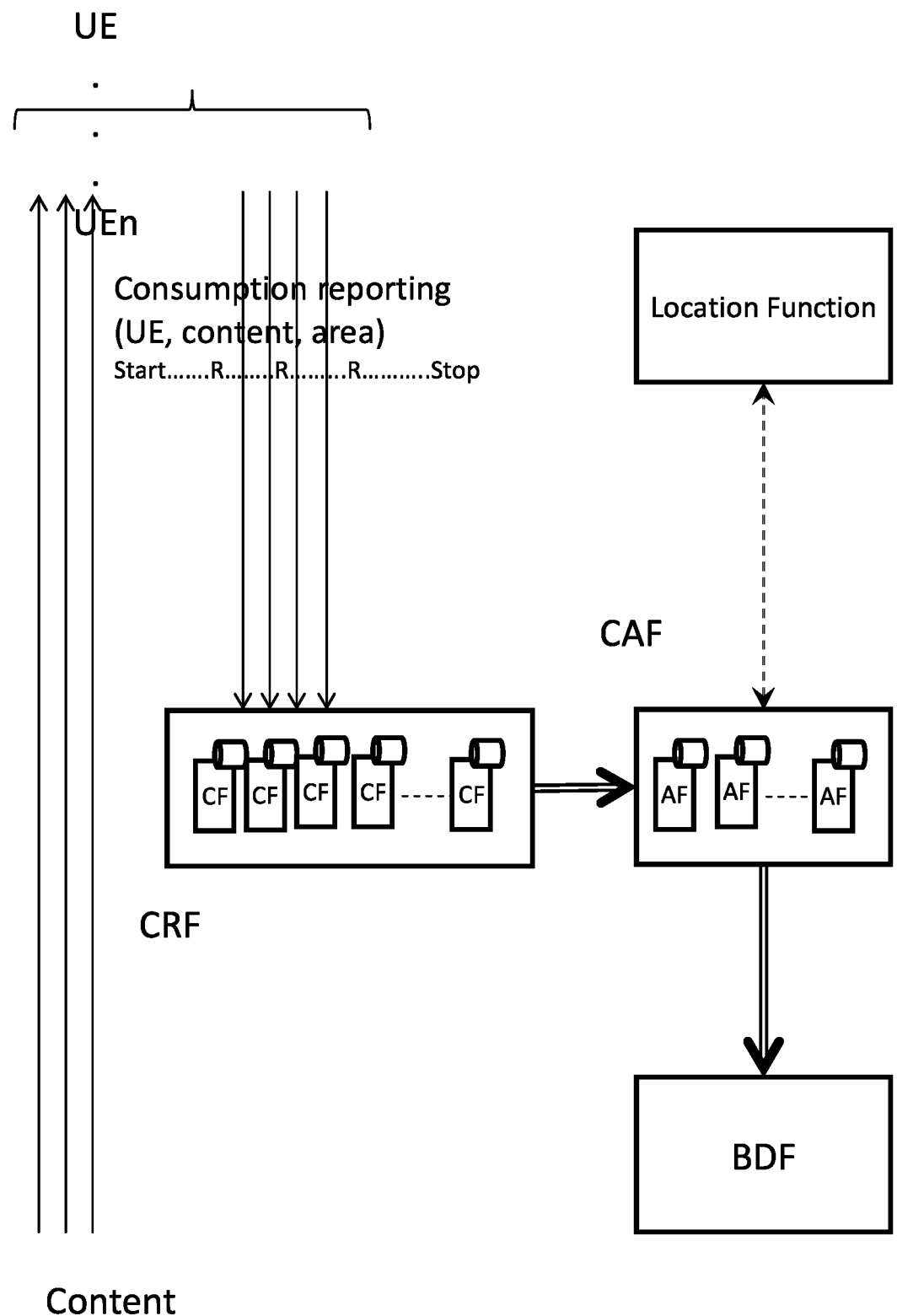
FIG. 6 provides an overview on reporting and aggregation.
Figure 7:
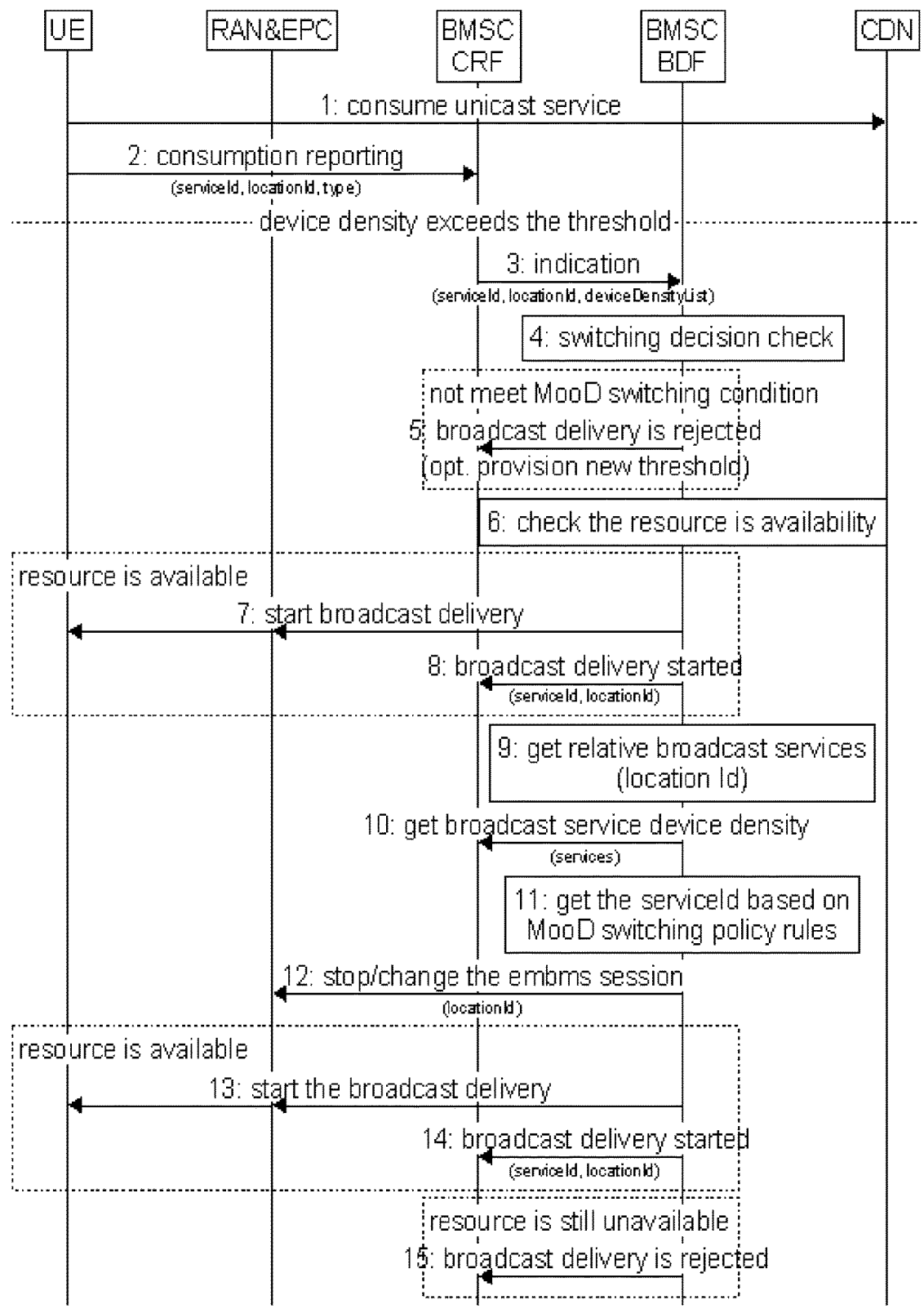
FIG. 7 provides a schematic message sequence diagram for UE service consumption and unicast/broadcast switching.

In some deployment realizations, there may be a Consumption Aggregation Function, CAF, between the Consumption Reporting Function, CRF, and the Broadcast Decision Function, BDF, as shown in FIG. 5A and FIG. 6. Input into the CAF can be either HTTP Proxies (which monitor MooD headers) or the CRF. The intention of the aggregation function is to provide counting information per service area reliably to the BDF. The BDF will make the switching decisions, Unicast to broadcast, or Broadcast back to unicast, based on the policy defined for the MooD eligible service. The actual switching is rerouting of content via the MBMS Data plane Function, MDF as part of the session and transmission function of the BMSC.

FIG. 6 provide a more detailed flow of consummation and reporting by the UE and the involved elements of the BMSC. The UE reports consummation as start and stop of consummation and/or regular (timer) based reports (R). The CRF keeps track of what content is consumed by which UE. Where the output of the CRF does not comply to the needs of consumer density per area per content as required by the BDF an aggregation function might adapt it e.g., correct for UEs moving from one area into another area or where the UE has not included location information in the report. It shall be noted that the aggregation function might also be included in the CRF or BDF.

BMSC supports 2 procedures for the MooD switching. The first one is the switching decision procedure based on the switching rules. The second one is the policy rules control procedure and it is required only when the broadcast resources are not enough for the new MooD eligible service. This procedure will execute additional operations based on the policy rules before activating the broadcast delivery for the new MooD eligible service.

The interface between the CAF and the BDF may be an event interface. Conceptually, the BDF provisions the CAF with a counting threshold for every Service Area so that the CAF can notify the BDF on threshold exceedance. When the Consumption aggregation function checks that the device density exceeds the predefined threshold, it will send the switching indication with serviceId, location area Id, current device density and the latest i.e. 10 device densities to the BDF. With the current device density and the latest 10 device densities, the BDF could understand the persistent duration exceed of the threshold and the continuous gradient of the device density for a service ID in an location area ID. BDF applies additional switching rules to check whether the new MooD eligible service is suitable to enable broadcast delivery.

For example, see FIG. 3B, BDF has defined that MooD configuration for a cell, cfg.MooDPersistentMinThreshold=3, cfg.PersistentDurationAboveMinThreshold=5, cfg.continuousPositiveGradient=70%, the figure depicts the service 1, service 2 and service 3 devices density change status.

Note, the switching threshold per cell is typically 2 to 4 devices. Service Areas (as identified by SAI) may be composed out of several cells. Devices report their location in form of a Service Area ID. The CAF cannot determine a precise "per-Cell" count of UEs, it assumes an average over the service area. Since the CRF and the CAF are counting on Service Area granularity, it may be preferred to use a counting density instead of an absolute number. The counting density ($\rho_{SAI}$) is defined by Number of UEs in the service area divided by the number of cells in that service area.

$$\rho_{SAI} = \frac{UEs_{SAI}}{Cells_{SAI}}$$

The following is the pseudo code to decide whether to do switching;

```
switchingRules(list[ ] deviceDensity)
{
persistDurAboveMinThreshold=0
contiPosGradient=0
UcToBcSwitchingFalg=false
samplingNum=min(length(deviceDensity) ,10)
For (j=0;j<= samplingNum; j++):
    if samplingNum <5:
        break;
    if list[j]>=cfg.MooDPersistentMinThreshold:
        persistDurAboveMinThreshold++
    else
        persistDurAboveMinThreshold-
    if j>=1
        if list[j] > list[j-1] // increase
            contiPosGradient++
        else //flat or decrease
            contiPosGradient-
if persistDurAboveMinThreshold >=
cfg.PersistentDurationAboveMinThreshold
    UcToBcSwitchingFalg =true
if contiPosGradient/samplingNum >= cfg.continuousPositiveGradient
    UcToBcSwitchingFalg =true
}
```

According to the result of pseudo code, the service 1 and service 3 could be established the broadcast delivery for the traffic offloading, it is because the former has the stable users in service consuming, and the latter means that there are a lot of users accessing the service in short time. The BDF may provision a new threshold for service 2 in the service area in that it adjusts the consumption reporting period for service 2, when the BDF want to postpone any frequent reassessment of the decision.

Then BDF should check whether there is enough broadcast resources for the new service, if there are enough broadcast resources, BMSC could start the broadcast delivery for this service immediately.

If BDF detects there is not enough broadcast resources for the new MooD eligible service broadcast delivery, it has to check the policy rules to do additional operations before activating the broadcast delivery. The policy rules actually rank the services in the service area according to a priority, which is defined by a number of metrics.

Preliminary, BDF should define the service priority based on the service type and payment of the content providers and the policy rules to retrieve the broadcast resources. The priority could be divided into i.e. 10 levels. Level 10 is used for the public safety service (i.e. MC-PTT, ETWS), Level 9 is used for the government compulsory service, level 3-8 is used for the managed services and based on the payment of the content providers, level 2 is used for the unmanaged services, and level 1 is used for the free services. The smaller the level value, the lower the priority. BDF should define the policy rules to retrieve the broadcast resources, the rules could be: 1—stopping the lowest priority broadcast service; 2—stopping the lowest device density broadcast service etc.

First, BDF should retrieve the broadcast services whose broadcast area includes area Id of the MooD eligible service. Then the BDF should retrieve the device density of all these services, and calculate which service should be released in this area to release the resources. After that, BDF updates the impacted service broadcast area to stop or update the MBMS session to release the broadcast resources. Finally, BDF starts the broadcast delivery for the MooD eligible service.

The following is the pseudo code for policy rules control to release the broadcast resources:

```
Define policyRule:
1: stopping the lowest priority broadcast service;
2: stopping the lowest device density broadcast service;
{
serviceList = RetrieveBroadcastService(locationId);
switch policyRule{
case 1: // stopping the lowest priority broadcast service
    serviceList = getLowestPriorityServiceByLocationId(locationId);
    if moodService.Priority < serviceList[0].Priority:
        Break; // will not activate the broadcast since the
        moodService priority is lower than the lowest priority in
        broadcast list
    list[ ] broadcastStatusList =
    retrieveServiceBroadcastStatus(serviceList, locationId);
    stoppingService=NULL;
    lowestDevDensity=-1;
    for broadcastStatus in broadcastStatusList:
        if getPriority(broadcastStatus.serviceId)>=9:
            continue;// skip the public safety service and
            government compulsory service
        avgDevDensity= average(broadcastStatus.devDensity)
        if (stoppingService==NULL):
            stoppingService= broadcastStatus.serviceId;
            lowestDevDensity = avgDevDensity
        elif avgDevDensity<lowestDevDensity:
            stoppingService= broadcastStatus.serviceId;
            lowestDevDensity = avgDevDensity
    stopSession(stoppingService, locationId);
case 2: // stopping the lowest device density broadcast service
    serviceList = getServiceByLocationId(serviceList);
    list[ ] broadcastStatusList =
    retrieveServiceBroadcastStatus(serviceList, locationId);
    stoppingService=NULL;
    lowestDevDensity=-1;
    for broadcastStatus in broadcastStatusList:
        if getPriority(broadcastStatus.serviceId)>=9:
            continue;// skip the public safety service and government
            compulsory service
        avgDevDensity= average(broadcastStatus.devDensity)
        if (stoppingService==NULL):
            stoppingService= broadcastStatus.serviceId;
```

-continued

```
            lowestDevDensity = avgDevDensity
        elif avgDevDensity<lowestDevDensity:
            stoppingService= broadcastStatus.serviceId;
            lowestDevDensity = avgDevDensity
    stopSession(stoppingService, locationId);
}
```

The policy rules could be extended to support "decreasing the bitrate (GBR of the MBMS bearer) of the lowest priority broadcast service", "decreasing the bitrate (GBR of the MBMS bearer) of the new MooD eligible service" etc. Decreasing the bitrate of broadcasted services may allow the BDF to carry more services using MBMS broadcast. The BDF may need to trigger the MBMS Session Update procedure in order to decrease or increase the GBR of and MBMS Bearer. The BDF triggers also the adjustment of the content bitrate by either reconfiguring the content encoder or by forwarding a different representation of the offering.

After the broadcast resources are released, and there is enough resources for the MooD eligible service, BDF triggers the BM-SC Session Controller to sends the session start request to activate the broadcast delivery for the MooD eligible service.

Watchdog Implementation

The watchdog implementation comprises the basic functions of CRF, CAF and BDF of a BMSC. Basically the watch dog acts per cell of the radio system. Based on consumption in that cell of MBMS user services the watchdog switches between unicast and broadcast delivery of a MBMS user service. UEs consuming MBMS user services are required to report consumption periodically as instructed in the ADP of each MBMS user service. Where the UE can report the identity of the actual radio cell, where consuming, the consumption report is provided to the watchdog of that cell. In the case the UE can only report the location area then the report is sent to all watchdogs of those cells that constitute that location area. In later case the counter in the Watchdog is preconfigured with the number of cells in the location area which it uses to divide the total count of consumers to have an average count for the cell.

Figure 8:
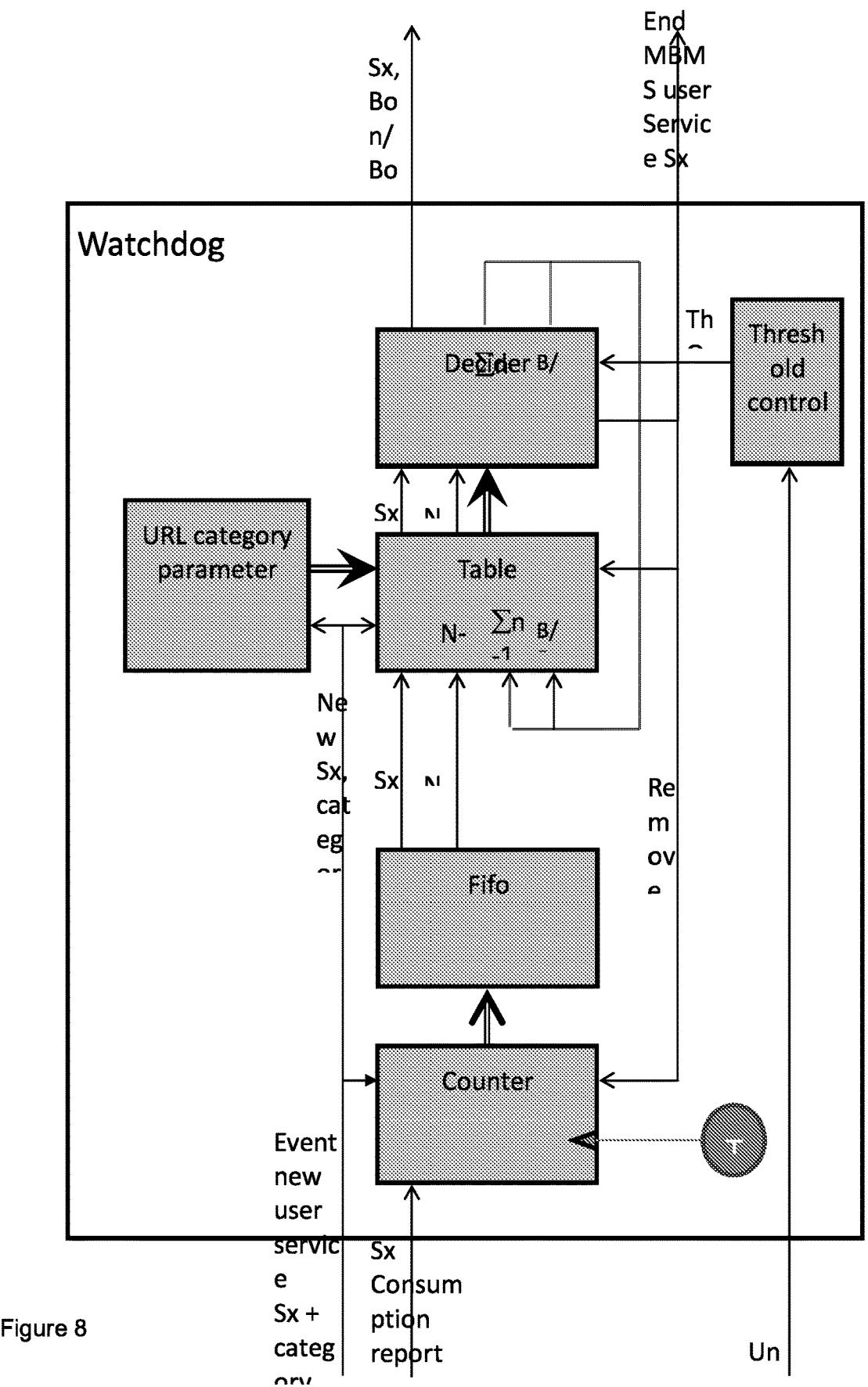
FIG. 8 provides a schematic drawing of a watchdog implementation.
Figure 9:
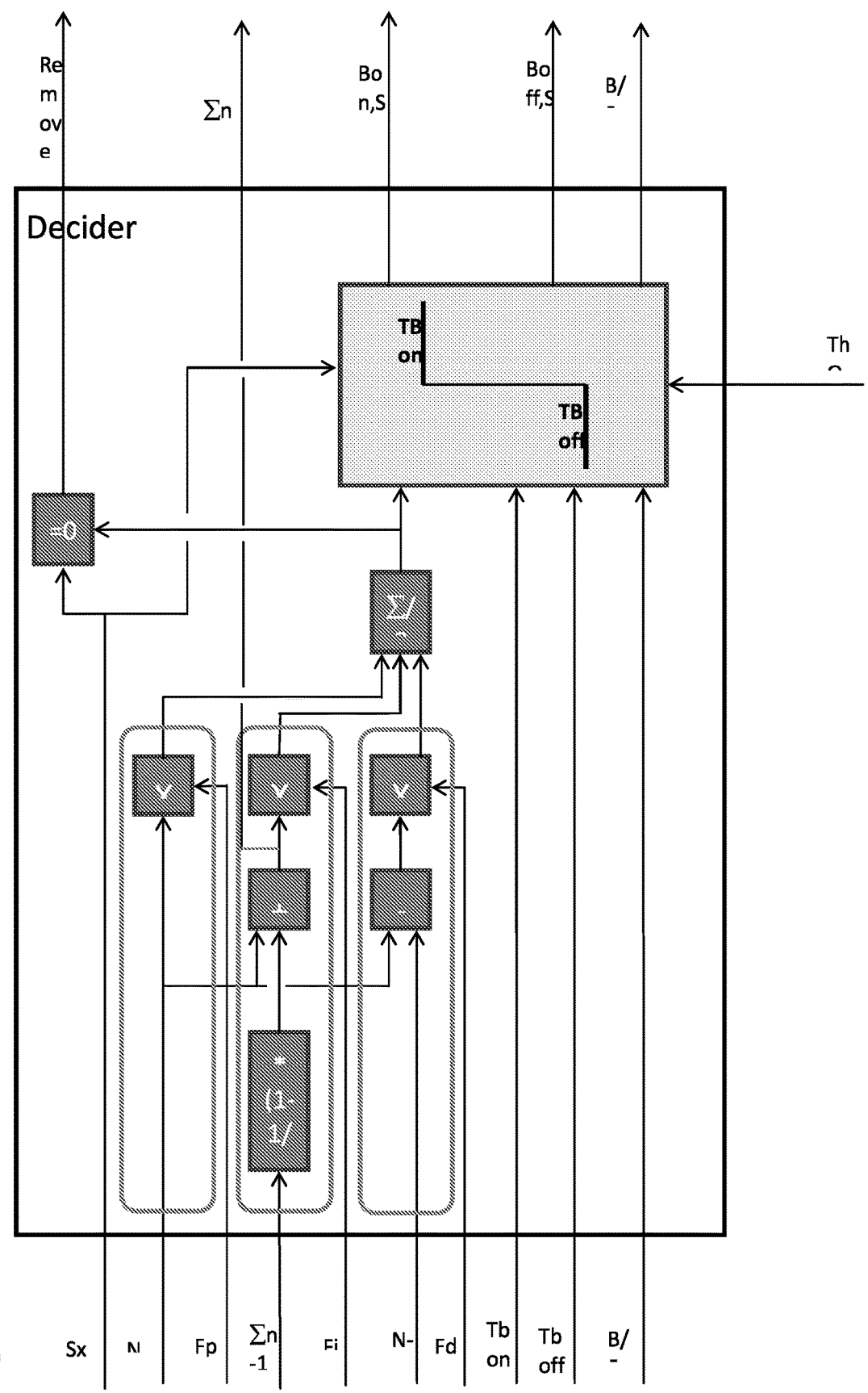
FIG. 9 provides a detailed view on a decider implementation.

FIG. 8 provides an overview of the Watchdog components whereas FIG. 9 provides a more detailed view on the decider.

Referring to FIG. 8 the counter is the first stage of the watchdog. It receives a continuous stream of consumption reports consuming MBMS user services from UEs in cell the watchdog controls or in the location area to which that cell belongs. Each report identifies the MBMS user service by the Service ID further denoted Sx. The counter comprises a number of counting registers, each assigned to a MBMS user service by means of its Sx. The assignment of Sx to a counting register is triggered by a new MBMS user service event specifying Sx and category of the new MBMS user service. A counting register is de-assigned with an end of MBMS user service, remove Sx, and the counting register becomes free again to be assigned for another Sx. For each received consumption report the corresponding counting register is increased by one based on the Sx in the report. The counting is performed in cycles equal to the reporting period set in the ADP. A time trigger T having the same period as the reporting period triggers the counter to copy all assigned counting registers to a FIFO as Sx, count pairs. Alternative, in the case of location area based reporting, the count is divided by a preconfigured number of cells constituting the location area.

The FIFO is the steering part of the second stage of the Watchdog. After loading by the Counter the FIFO starts outputting Sx/N, Service ID/count pairs for decision till all pairs are decided upon. Then the FIFO waits till it is loaded again by the counter. Each outputted pair of the FIFO starts a decision cycle performed by the TABLE and Decider components of the Watchdog. The Sx in the pair identifies a record in the TABEL which fields are provided to the Decider. When the decision is complete the results are written back in the record and a new Sx,N pair is provided by the FIFO. When a new MBMS user service event occurs, a new record is created in the table with the identification Sx as provided. The event also comprises the category the new MBMS user service belongs to. This category identifies a record in the Category Parameter Store. The parameters in that record are copied into the new created record in the TABLE. The category parameter records might be preconfigured in the store, adjustable via an operator/maintenance interface, updated by a central function of the MBMS or downloaded and updated via a central repository for rules like a PCRF or the like.

Further component of the Watchdog is the threshold control. Threshold control provides a threshold offset ThO to the Decider. Input to the threshold control is a MBMS broadcast capacity characteristic Unl, e.g., available GBR, number of MBMS bearers etc. as outlined before. In threshold control the available is divided by the maximum preconfigured to obtain a figure between 0 and 1 as ThO. Depending on the implementation the capacity characteristic can be available whether used or not, number used or number available still free. ThO=0 means that no capacity is free anymore.

Referring to FIG. 9 the decider uses category parameters, Sx, count and previous saved values for deciding if switching is required. The switch decision is provided as a trigger, switch to broadcast (Bon) or back to unicast (Boff) accompanied by the Sx for which the trigger is valid. After the decision, the decision results are written back in the TABLE. Apart from the switch decision the Decider can also decide to end a MBMS user service. It therefore provides a remove Sx trigger to both counter and table, as well as to the central functions of the MBMS to end the user service. The trigger causes the counter to de assign the counting register for Sx and the TABLE to delete the record for Sx.

The actual decision process of the Decider may comprise 2 steps, adjustment of the count to incorporate trend, and comparing to thresholds and creation of the Bon/Boff when needed. In addition the remove Sx is generated by the Decider.

The adjustment of the count may comprise 3 parts, proportional, integrating and differentiating. The proportional part multiplies the count (N) from the Sx,N pair with a proportional factor Fp received from the TABLE. The integrating part receives from the TABLE the previous average $\Sigma N-1$ and the integrating factor Fi. The previous average is multiplied with $1-1/W$, where W is the window size, as number of reporting periods. Then N from the received pair is added. This is the new average $\Sigma N$ that will be written back to the TABLE. The sum is multiplied with the integrating factor. The differentiating part receives from the TABLE the previous count for Sx, N-1 and the differentiating factor Fd. The previous count N-1 is subtracted from the current count N times 2 and the result is multiplied with Fp. When writing back results in the table current count N is written back as previous count N-1 for the next cycle for Sx. Finally the results are added to form the adjusted count. If the factors are normalised, e.g., the sum of them=1, no final division ($\Sigma/3$) of the adjusted count is required. The adjusted count is used in comparing with thresholds and for determining to end a user session (Remove Sx).

When the adjusted count=0 this may be the trigger for providing the Remove Sx. It shall be noted that with applying the integrating part the count must be 0 for at least the window size of the integrating part before the adjusted count becomes 0. This has advantages for now and then consumed content or preamble of rising trend. Instead of =0 also <1 or <2 may be used to drop MBMS user services earlier.

For comparing the adjusted current count with thresholds, these comprise an upper (Tbon) and lower threshold (Tboff) provided by the TABLE. These thresholds are category dependent and derived from the category parameter store with the new Sx event. This implementation uses the method of per category ranking instead of ranking on basis of category adjusted count with hysteresis in the thresholds (instead both may be combined as one threshold but loosing hysteresis). The distance between Tbon and Tboff provide a hysteresis avoiding jittering between unicast and broadcast when close to the thresholds. The second aspect is that both thresholds are subject to a threshold offset ThO. ThO has a value between 0 and 1 and. Both Tbon and Tboff are multiplied with ThO. So, the thresholds of all categories are affected in the same way.

The adjusted count is compared with both thresholds.

If lower than the upper threshold and higher than the lower threshold no switching action is initiated. The received B/U from the TABLE, indicating if the MBMS user service Sx was in Broadcast or not, is written back to the TABLE as received.

If higher than the upper threshold and B/U=1 (already broadcasted) no action and write back B/U=1 as received.

If higher than the upper threshold and B/=0 (not yet broadcasted) issue Switch order for Broadcast of Sx (Bon,Sx) and write back B/U=1.

If lower than the lower threshold and B/U=0 (not yet broadcasted) no action and write back B/U=0 as received.

If lower than the lower threshold and B/U=1 (already broadcasted) issue Switch order for unicast of Sx (Boff,Sx) and write back B/U=0.

The Watchdog can be implemented in dedicated circuitry, ASICs, state sequencer, by means of a programmable logic controller, as embedded software in a controller board, as software routines in a server, or by other means as known to the skilled person. The Watchdog implementation also allows integration of the decision functionality in radio access equipment separate from the BMSC in the core network but still under control of the BMSC. In this solution the central functions like announcement, session and transmission etc. maintain in the BMSC as well as handling the interfaces towards proxy's and content providers.

The present disclosure is not limited to the embodiments as disclosed above, and can be modified, combined and enhanced by those skilled in the art beyond the scope of the present disclosure as disclosed in the appended claims without having to apply inventive skills.

Some further embodiments;
1. A method performed by a Broadcast Multicast Service Center, BMSC, in a Multimedia Broadcast/Multicast Service, MBMS, system deciding on switching between unicast and broadcast delivery of content to User Equipment, UEs, connected to the MBMS, Characterised by the steps of;

Receive counts on the consumption of said content by UEs

Adjusting first applied thresholds on basis of the availability of resources for broadcast delivery of content, and Deciding to switch content from unicast to broadcast delivery when the counts of UEs consuming said content exceeds said first adjusted thresholds.

2. Method according to 1 where said BMSC applies second thresholds and performs the additional steps of;

Adjusting said second thresholds on basis of the availability of resources for broadcast delivery of content, and Deciding to switch content from broadcast to unicast delivery when a count of UEs consuming said content becomes lower then said adjusted second thresholds.

3. Method according to 1 or 2 where said adjusting is done on basis of available bandwidth for broadcast and/or maximum number of broadcast bearers possible.

4. Method according to 2 where said second thresholds are lower then said first thresholds to avoid frequent switching between unicast and broadcast.

5. Method according to 1 or 2 where said first and second thresholds are adjusted per area based on the available resources for that area.

6. Method according to 1 comprising the additional steps of;

Receiving a request for broadcast of a content, and

Starting a MBMS user service for said content.

7. Method according to 1 comprising the additional steps of;

Receiving a request for broadcast of a content, and

Adding the content to a MBMS user service bundle.

8. Method according to 1 or 2 wherein the counts of said UEs consuming content is received per area on basis of the location of said UEs being inside that area.

9. Method according to 7 or 8 wherein said area is part of a MBMS coverage area comprising location areas and radio cell areas.

10. Method according to 9 where the area for counting is a location area, and where the area for adjusting is a radio cell area, and where the coverage area of the location area comprises a number of radio cell areas, comprising the additional step of;

Dividing said counts of UEs consuming content by the number of radio cell areas.

11. Method according to 1 comprising the additional steps of;

Ranking all content for which the count exceeds said first thresholds on basis of said count, Keeping or switching to broadcast higher ranking content that can be supported by the available resources for broadcast delivery, and Leaving or switching back to unicast the remaining lower ranking content that cannot be supported by the available resources for broadcast delivery.

12. Method of 1 or 2 where content belongs to a certain category having a importance/priority value, characterised by the additional steps of;

Receiving a definition of said categories, and

Assigning a category to a content on basis of said definition,

13. Method according to 12 characterised by the additional step of;

Adjusting a received count of UEs that report consumption of said content on basis of an importance/priority value of the category assigned to said content.

14. Method according to 12 where first thresholds are differentiated for one or more categories, characterised by the additional step of;

Assigning a category to a first threshold,

Applying first thresholds having an assigned category, to received count of UEs consuming content having an assigned category, on basis of matching of said assigned category to first thresholds and said assigned category to received count of UEs consuming content.

15. Method according to 12 characterised by the additional step of;

Excluding said content for comparison with said adjusted first thresholds and switching to or keeping delivery of said content in broadcast independent of said adjusted first thresholds when the assigned category to said content has a certain importance/priority value.

16. Method according to 11 comprising the steps of;

Checking if content of the remaining lower ranking content can be kept or switched to broadcast using an alternative Quality of Service, and Keeping or switching to broadcast said content of the remaining lower ranking content using said alternative Quality of Service.

17. Method according to 11 comprising the steps of;

Checking if content of higher ranking content has an alternative Quality of Service consuming fewer resources, and Applying said alternative Quality of Service for said content to free resources 18. Method according to 1 comprising the additional step of;

Adjusting said counts of UEs that report consumption of said content with a factor based on a trend in time of said counts.

19. Method according to 18 comprising the additional step of;

Calculate said factor on basis of integration of a number of consecutive counts.

20. Method according to 18 comprising the additional step of;

Calculate said factor on basis of differentiation on a number of consecutive counts.

21. Method according to 1 or 2, where said BMSC applies third thresholds and performs the additional step of;

Deciding to end a MBMS user service when a count of UEs consuming said MBMS user service becomes lower then said third thresholds.

22. A Broadcast Multicast Service Center, BMSC, being adapted to perform any of the methods of 1 to 21.

23. A watchdog component of a BMSC comprising a counter, decider and threshold control characterised in that;

Said counter having receiver for receiving reports from UEs consuming user services, a register per user service for counting the number of UEs that report consummation of user services and transmitter for transmitting at regular interval a counted number of UEs consuming user services, Said threshold control having receiver for available bandwidth for and/or number of available broadcast bearers, calculation logic for calculating a threshold offset from available bandwidth for and/or number of available broadcast bearers and transmitter for transmitting said threshold offset, and Said decider having receiver for receiving at a regular interval the counted number of UEs consuming said user services, logic to compare said counted number with a set of thresholds adjusted with a threshold offset received from threshold control, and output for a MBMS unicast/broadcast switch signal for said user services.

24. A watchdog component of a BMSC according to 23 further characterized in that;

Said counter having a receiver for receiving a new user service event signal used by the counter to add a register for said new user service, Said counter having a receiver for receiving an end user service signal used by the counter to remove a register for said user service to end, and Said decider having output for transmitting said end user service signal 25. Computer program product comprising coded instructions to let a BMSC server execute the methods of any of 1 to 21.

26. Computer readable medium comprising the computer program according to 25.

ABBREVIATIONS

ADP Associated Delivery Procedure
AVP Attribute-Value Pair
BDF Broadcast Decision Function
BMSC Broadcast Multicast Service Center
CAF Consumption Aggregation Function
CDN Content Distribution Network
CRF Consumption Reporting Function
DASH Dynamic Adaptive Streaming over HTTP
eMBMS evolved Multimedia Broadcast/Multicast Service
EPC Evolved Packet Core
E-UTRAN Evolved UMTS Terrestrial Radio Access Network (LTE)
EWTS Earthquake and Tsunami Warning System
FEC Forward Error Correction
FLUTE File Delivery over Unidirectional Transport
GBR Guaranteed Bit Rate
GCI Global Cell Identifier
GPRS GSM Packet Radio System
GSM Global System for Mobile Communications
HTTP Hyper Text Transfer Protocol
LA(I) Location Area (Identity)
LCS LoCation Services
LTE Long Term Evolution
MBMS Multimedia Broadcast/Multicast Service
MBMS-GW MBMS GateWay
MC-PTT Mission-critical push-to-talk
MDF MBMS Data plane Function
MPD Media Presentation Description
MME Mobility Management Entity
MooD MBMS operation on Demand
OMA-DM Open Mobile Alliance (OMA) Device Management (DM)
PCRF Policy and Charging Rule Function
PDN Packet Data Network
PDN-GW PDN GateWay
RAN Radio Access Network
RTP Real-Time Protocol
RTSP Real-Time Streaming Protocol
SA Service Area
SAI Service Area ID (identification)
SGSN Serving GPRS Support Node
UDP User Datagram Protocol
UE User Equipment
UMTS Universal Mobile Telecommunications System
URI Universal Resource Identifier
USD User Service Discovery/Description
UTRAN UMTS Terrestrial Radio Access Network

The invention claimed is:

1. A method of operation by a Broadcast Multicast Service Center (BMSC) in a Multimedia Broadcast/Multicast (MBMS) system included in or associated with a communication network, the method comprising:
determining whether a consumption condition is satisfied with respect to a service, the consumption condition being a change in the number of User Equipments (UEs) consuming the service in a cell of the communication network satisfying a defined trend; and
responsive to the consumption condition being satisfied and sufficient communication-network resources not being available in the cell for broadcast delivery of the service, ranking the service in relation to one or more other services being delivered in the cell via broadcast delivery and, responsive to one or more of the one or more other services being lower ranking, initiating the change from unicast delivery of the service in the cell to broadcast delivery of the service in the cell in conjunction with initiating a change in one or more of the one or more lower ranking services from broadcast delivery in the cell to unicast delivery in the cell.

2. The method of claim 1, wherein determining whether the consumption condition is satisfied with respect to the service comprises determining whether, as the defined trend, the number of UEs consuming the service in the cell has increased by at least a defined amount during an interval.

3. The method of claim 1, wherein determining whether the consumption condition is satisfied with respect to the service comprises determining whether, as the defined trend, the average number of UEs consuming the service in the cell during a defined interval satisfies a threshold count.

4. The method of claim 1, wherein there are categories of services, the respective categories having a defined relative ranking, and wherein ranking the service in relation to one or more other services being delivered in the cell via broadcast delivery comprises comparing the category of the service with the categories of the one or more other services.

5. A network node configured for operation as a Broadcast Multicast Service Center (BMSC) in a Multimedia Broadcast/Multicast (MBMS) system included in or associated with a communication network, the network node comprising:
communication circuitry configured to communicatively couple the one or more network nodes with the communication network; and
processing circuitry configured to:
determine whether a consumption condition is satisfied with respect to a service, the consumption condition being a change in the number of UEs consuming the service in the cell satisfying a defined trend; and
responsive to the consumption condition being satisfied and sufficient communication-network resources not being available in the cell for broadcast delivery of the service, rank the service in relation to one or more other services being delivered in the cell via broadcast delivery and, responsive to one or more of the one or more other services being lower ranking, initiate the change from unicast delivery of the service in the cell to broadcast delivery of the service in the cell in conjunction with initiating a change in one or more of the one or more lower ranking services from broadcast delivery in the cell to unicast delivery in the cell.

6. The network node of claim 5, wherein the processing circuitry is configured to determine whether the consumption condition is satisfied with respect to the service by determining whether, as the defined trend, the number of UEs consuming the service in the cell has increased by at least a defined amount during an interval.

7. The network node of claim 5, wherein determining whether the consumption condition is satisfied with respect to the service comprises determining whether, as the defined trend, the average number of UEs consuming the service in the cell over a defined interval satisfies a threshold count.

8. The network node of claim 5, wherein there are categories of services, the respective categories having a defined relative ranking, and wherein ranking the service in relation to the one or more other services being delivered in the cell via broadcast delivery comprises comparing the category of the service with the categories of the one or more other services.

* * * * *